United States Patent [19]
Sheppard

[11] 3,954,148
[45] May 4, 1976

[54] DUAL HYDRAULIC POWER STEERING SYSTEM WITH ADJUSTED MECHANICAL ADVANTAGE AND METHOD

[76] Inventor: Richard H. Sheppard, c/o R. H. Sheppard Co., Inc., Hanover, Pa. 17331

[22] Filed: Nov. 1, 1974

[21] Appl. No.: 520,161

Related U.S. Application Data

[63] Continuation-in-part of Ser. No. 411,823, Nov. 1, 1973, Pat. No. 3,848,693.

[52] U.S. Cl. ............................................. 180/152
[51] Int. Cl.² ........................................... B62D 5/06
[58] Field of Search ............................... 180/79.2 R

[56] References Cited
UNITED STATES PATENTS

| | | | |
|---|---|---|---|
| 3,602,326 | 8/1971 | Garrison | 180/79.2 R |
| 3,776,356 | 12/1973 | France | 180/79.2 R |
| 3,822,759 | 7/1974 | Sheppard | 180/79.2 R |

*Primary Examiner*—Robert R. Song
*Assistant Examiner*—John A. Pekar
*Attorney, Agent, or Firm*—Lowe, King, Price & Markva

[57] ABSTRACT

A dual power steering system has a master and slave steering combination, valve means on the master unit, interconnecting linkage and each unit having a built-in mechanical advantage factor. The mechanical advantage of the master unit is made to be greater than the mechanical advantage of the slave unit to assure that the master always dominates the slave during operation to prevent feedback of power through the tie rod of the steering linkage and thereby prevent preemptive change in positioning of the valve means of the slave unit. This, in turn, eliminates chattering or fighting between the units that occurs especially in left-turn operation. In one embodiment, the mechanical advantage factor is defined by the angle of movement of the crank divided by the angle of movement of the steering arm (or wheel). The ratio of the master unit factor to that of the slave unit must be greater than one. The cranks on the steering units are preferably positioned beyond the position of maximum throw. In a second embodiment, the output power rating of the master unit is sufficiently greater than that of the slave unit to provide the desired mechanical advantage ratio. In either embodiment, the ratio is selected to be only slightly greater than the threshold value to maximize the output power of the steering units.

9 Claims, 9 Drawing Figures

LEFT TURN $$\frac{\text{MASTER}}{\text{SLAVE}} = \frac{47.5/38}{30/25.3} = \frac{1.250}{1.186} > 1$$

RIGHT TURN $$\frac{\text{MASTER}}{\text{SLAVE}} = \frac{30.25/24.67}{45.5/37.75} = \frac{1.226}{1.205} > 1$$

DUAL HYDRAULIC POWER STEERING SYSTEM WITH ADJUSTED MECHANICAL ADVANTAGE AND METHOD

CROSS REFERENCE TO RELATED APPLICATION

This application is a continuation-in-part of my copending application entitled "Dual Hydraulic Power Steering System with Hydrostatic Control," Ser. No. 411,823, filed Nov. 1, 1973, now U.S. Pat. No. 3,848,693, issued Nov. 19, 1974.

FIELD OF THE INVENTION

The present invention relates to hydraulic power steering systems, and more particularly, to an arrangement for assuring synchronization of master and slave units so as to assure full time dominance of the master unit.

BACKGROUND OF THE INVENTION

Today, it is becoming increasingly popular to provide steering systems that utilize two or more power units rather than a single power unit. Basically, especially in trucks and off-the-road vehicles, the increased size and weight and the increased size of tires, has dictated the need for increased power to allow comfortable steering of the vehicle.

Typically, two steering gears are employed, one adjacent each wheel of the vehicle to provide the increased steering capacity. The steering function is more efficiently carried out when the power is applied immediately adjacent to the wheels. The steering gear units may be smaller and more compact in order to fit within the crowded confines under the truck. The steering linkage, including the tie rod connecting the two sides of the steering mechanism, is under much less strain in a duel system since the full working force does not have to be translated across the vehicle.

In the past, when these dual systems have been installed on vehicles, it has been common practice to simply mount the units and connect the drag links to the crank of the steering units without further thought. A problem that apparently arises is one of improper synchronization or coordination between the two power units. Depending upon the particular geometry of the steering linkage, the system of the prior art is beset by various degrees of chattering or fighting between the units. In the past, when the problem of steering chatter is acute, no specific steps were known to correct the system to make the dual system feasible. The designers simply went back to a single system, abandoning the advantages afforded by a dual system. This problem more than any other single factor has probably contributed to dual systems not having been accepted to any greater than they have.

In any steering system, dual systems included, the designer has also in the past followed the general rule of determining the connection of the drag link to the crank of the steering unit, and then simply positioning the output pinion on the rack so that full throw of the piston may be obtained. As stated however, depending on the particular geometry of the steering linkage, this "rule of thumb" policy has met with various degrees of failure. In some cases, the steering chatter may be so weak as to be barely detectable. In others, the vehicle shakes violently under certain circumstances. In all cases, efficiency and safety of the system are seriously impaired.

The geometry of the steering systems on modern vehicles is very complex, particularly since the wheels turn different angles for proper tracking of the wheels as the vehicle goes around a corner. This has made the solving of the problem all the more difficult.

I have determined the cause of the problem as preemptive feedback of power from the slave unit to the master unit through the tie rod. Until now, the problem has defied solution short of completely redesigning the steering system. This is not only extremely expensive, but in some cases the space limitations of the vehicle make it impossible. The desirability of the basic advantages of a dual system is an extra incentive to find a solution.

The solution should be in the form of a simple change with respect to the steering units in order to avoid the undesirable redesigning of the steering linkage of the vehicle. With such a prerequisite, it is contemplated that the principles of the invention could be applied to any vehicle, thus saving the manufacturer the expense and trouble of redesigning the entire steering system. On existing vehicles, a simple adjustment should correct the problem of steering chatter.

OBJECTIVES OF THE INVENTION

Accordingly, it is a first object of the present invention to provide an arrangement for modification or adjustment of dual power steering systems to establish synchronization of the power units without the shortcomings experienced previously.

It is another object of the present invention to provide a dual power steering system wherein feedback of power from the slave unit attempting to move the control valve of the master unit prematurely is prevented.

It is another object of the invention to eliminate steering chatter by establishing a ratio of mechanical advantage factor of the master unit to that of the slave unit greater than one.

It is still another object of the present invention to provide the proper ratio of mechanical advantage factors by simple adjustment of the length of the drag link.

BRIEF DESCRIPTION OF THE INVENTION

A dual power steering system is provided having master and slave steering units, valve means on the master unit, an output crank on each unit, a steering arm of the interconnecting linkage for each crank, tie means for synchronizing the steering arms and a drag link between the crank and the steering arm. According to the preferred embodiment of the invention, the drag link is adjusted so that the ratio of the mechanical advantage factor of the master unit to that of the slave unit is greater than one. Under these conditions, the master unit dominates the slave unit to prevent feedback of power through the tie rod during any steering operation, left or right. By preventing the feedback, the valve on the master unit is not subject to preemptive change, which is a condition that causes the undesirable chattering or fighting between the two steering units.

In accordance with the preferred embodiment, the output power rating of the two units are approximately the same so that the steering units of any one vehicle are interchangeable, thus reducing costs of manufacture and maintenance. The mechanical advantage factor is adjusted by adjusting the angle of movement of the crank on the master unit. Since the angle of movement of the steering arm remains constant, with the increase in the movement of the crank, the mechanical advantage is clearly increased on the master unit, and thus the objective is obtained. The adjustment is stopped just at the threshold point so that maximum throw of the crank and utilization of the power of the master unit is maintained insofar as it can be consistent with the proper synchronization with the units.

The principles of the present invention are capable of use in arrangements where the left and right front wheels turn through different angles for proper tracking.

In the typical vehicle manufactured in the United States where the steering column is on the left side and thus the master steering unit is on the left side, the area of greatest concern is on the left turn. This is so since the left or the inside wheel has to be turned to the greater angle and thus requires the greater force. Under this circumstance, it is easiest for the slave gear to anticipate or feed back residual force to the master gear since it is under this condition working less. Once the proper relationship of the ratio between the mechanical advantage factor is determined for the left turn, the ratio in the right turn is acceptable. In the right turn, the left wheel is turning less so that less force is required by the master unit, and dominance by the master unit is therefore inherent. Of course, in a vehicle with right side steering, the situation is reversed; i.e., the master unit is on the right side and the area of concern is the right turn.

It has been determined that the easiest adjustment to accomplish the desired results of the present invention is where the drag links are made substantially the same length and the cranks of the steering units are positioned for straight ahead driving just beyond the position of maximum throw away from the steering arm. Thus, for example, if the "normal" position of the crank arm would be vertical, a movement of the crank arm to 16° for straight ahead driving can result in successful adjustment of the system.

To explain further, it is apparent that when the cranks are moving through the normal "vertical" position and the drag link is horizontal, the amount of the movement is greatest but the mechanical advantage or available force of the two connected parts (crank plus drag link) is the least. It follows, as in any "toggle-type" mechanism, when the crank moves toward ninety degrees from the vertical (that is, horizontal or where the crank and the drag link come closer and closer to overlying and being parallel to each other) the amount of movement of the drag link is reduced (finally to zero where the two parts actually overlie each other) and the available force then goes to a maximum.

It is also true that with the angle of movement of the cranks greater than the movement of the respective wheels (see FIGS. 3a, 3b, and 4a, 4b) a positive mechanical advantage greater than 1 is thus realized. The mechanical advantage could be less than 1 under circumstances where the wheel moves through a greater angle. In any case, the master gear is set up so that it gets greater mechanical advantage from the linkage (where the units are of the same strength) than the slave gear for both left and right turns. This allows the master to dominate at all times. The simple means or procedure by which this is done in the instance described in accordance with the invention, is by simply moving the cranks to the new forward position.

In the method of the present invention, the first step is to determine the positions of the output cranks where maximum throw and utilization of the output power is obtained. This is in the region of straight ahead driving since the wheels must turn in both directions for steering of the vehicle. Once this position is found, the drag links are adjusted to move the output cranks off the maximum throw and utilization position. This step is not in accordance with the teachings of the prior art, and thus is of substantial importance to the concept of the present invention. The adjustment is made in the direction to provide the ratio of mechanical advantage factor of the master gear to that of the slave gear greater than one. With the master gear having the greater mechanical advantage, it is thus impossible for the slave gear to provide feedback across the tie rod to preempt repositioning of the valve in the master unit. The residual steering force of the combined units is maintained always toward the slave unit. In other words, the slave unit works harder so that it does not have reserve to feedback across to the master to disrupt the desired synchronization of movement.

The adjustment is stopped at the point where the ratio of mechanial advantage factors is only slightly greater than the threshold value of one. This maximizes the output power of the steering units while maintaining the dominance of the master unit. The additional step of checking the adjustment for both the loaded and the unloaded conditions of the vehicle is important for assuring proper operation over the full range that might be encountered.

In a second embodiment, the mechanical advantage ratio is obtained by providing a master unit with an output power rating sufficiently greater than that of the slave unit to maintain the ratio greater than one under all operating conditions. This concept is disclosed, but not claimed in my copending application "Dual Hydraulic Power Steering with Hydrostatic Control," Ser. No. 411,823, filed Nov. 1, 1973, of which this case is a Continuation-in-part, now U.S. Pat. No. 3,848,693, issued Nov. 19, 1974.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be readlized, the invention is capable of other difficult embodiments, and its several details are capable of modification in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
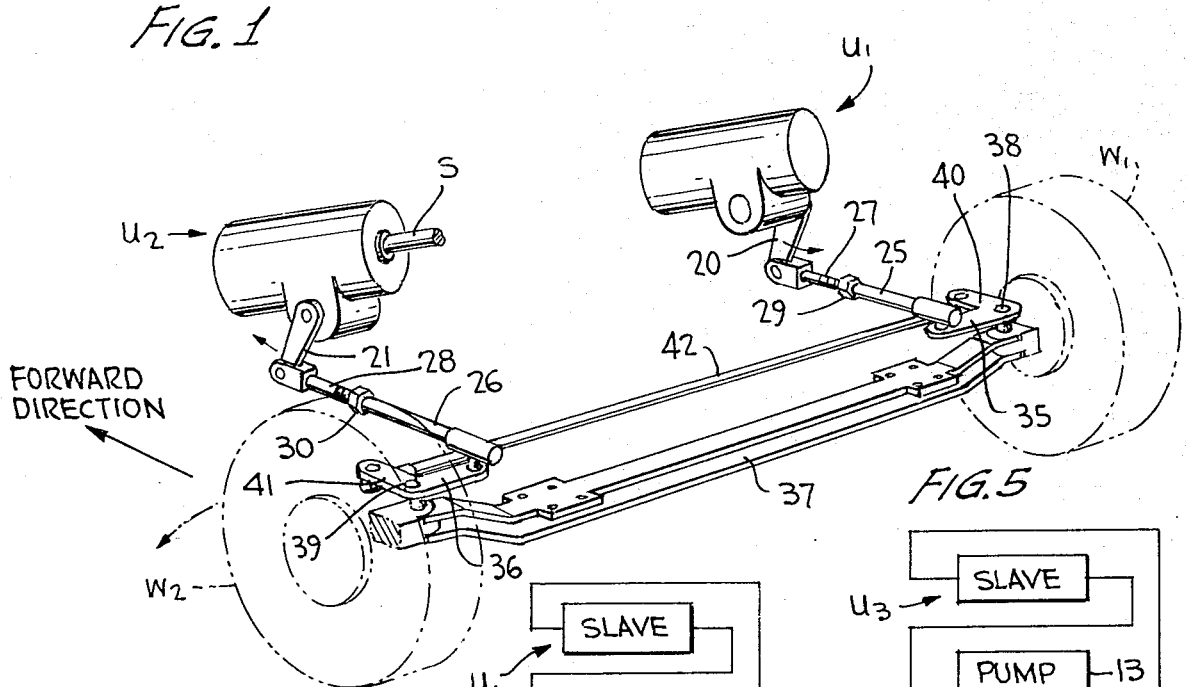
FIG. 1 is an overall perspective view of the preferred embodiment of a power steering system constructed in accordance with the principles of the present invention.

With reference now specifically to FIG. 1, a more detailed description of the invention can be provided. In this figure, there is illustrated a slave unit $U_1$ and a master unit $U_2$. As shown, these are typical integral power steering units that may be constructed in accordance with my previous U.S. Pat. Nos. 3,092,083 and 3,566,751. As shown, the master unit $U_2$ is positioned on the left-hand side of the vehicle, as is typical in the United States. A steering shaft S operates the master unit $U_2$ having a valve for control within the piston, as shown in my previous patents. As pointed out in my copending application Ser. No. 520,160 entitled "Fluid Control System for Dual Power Steering", filed Nov. 1, 1974, the valve within the piston may operate both the master unit $U_2$ and the slave unit $U_1$. As also pointed out in this copending application, either the well known single control circuit, or the double control circuit providing redundancy for safety, may be utilized in this type of dual steering system.

Figure 1A:
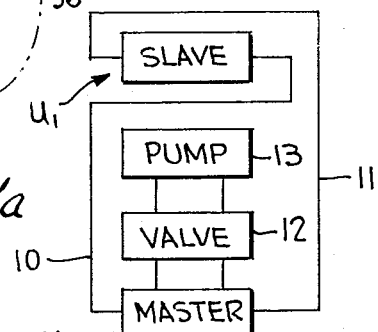
FIG. 1a is a schematic diagram of this preferred embodiment and showing master and slave units of the same size.

In FIG. 1a, a schematic diagram shows, as an example, the single control circuit that may be used with the preferred embodiment of the invention. The slave unit $U_1$ and the master unit $U_2$ are of the same size; that is, they have the same output rating. The opposite ends of the master unit $U_2$ are connected through transfer lines 10, 11 to the corresponding ends of the slave unit $U_1$. The master is supplied with high pressure hydraulic fluid through valve means 12 (actually housed within the master unit $U_2$) from a pump 13.

The power steering units $U_1$, $U_2$ have output cranks 20, 21, respectively. These cranks are positioned in accordance with the principles of the preferred embodiment of the present invention, as will be explained later in detail. Suffice it at the moment to say that the cranks 21, 21 are positioned for the straight ahead driving mode. When the cranks move in the direction of the arrows in this figure, the wheels $W_1$, $W_2$ turn toward a left-hand turn (note dotted line outlines), as will be discussed in conjunction with FIGS. 3a and 3b later.

The cranks 20, 21 are connected by suitable ball joints to adjustable drag links 25, 26. These links include interconnected threaded portions 27, 28, respectively. These threaded portions are locked into position by the lock nuts 29, 30.

The drag links are, in turn, connected by universal joints to the steering arms 35, 36 mounted on spindles of front axle 37 by pivot pins 38, 39. Crank arms 40, 41 are fixed to the steering arms 35, 36, respectively, and are connected by tie rod 42. This total linkage system is operative to turn the steered wheels $W_1$, $W_2$ of any suitable vehicle (not shown).

In accordance with the present invention, the problem of improper synchronization or coordination between the slave steering unit $U_1$ and the master steering unit $U_2$ is corrected. The synchronization is of course basically accomplished through the tie rod 42 as the steering units operate in unison. However, because of differences in geometry and the need to turn the wheels different amounts for proper tracking around the corners, the simultaneous working of the units without interfering with one another is a practical impossibility.

Since the valve 12 is located in the master unit $U_2$ and is operated by the steering shafts S, I have discovered that it is necessary for this unit to be the dominant power source throughout the full arc of power steering. That is to say, from the locked position of a left-hand turn to the locked position of a right-hand turn, the master unit, in accordance with the invention, must work slightly less than the slave unit $U_1$ so that any residual force tending to be fed across the tie rod 42 is in the direction of the slave unit $U_1$, and not vice versa.

In the past, the set-up of dual power steerings of this type has been without any real thought to the best position of the output cranks 20, 21. The cranks are usually by happenstance more or less vertical. This set-up has been previously dictated by the given length of the drag link for the steering linkage designed by the truck manufacturer, not the power steering gear manufacturer.

In this vertical crank position, as generally taught by the prior art, assuming that the power units $U_1$, $U_2$ are of the same size, the geometry of the steering linkage can allow a greater mechanical advantage to the slave unit $U_1$. With this greater mechanical advantage, the direction of the residual force, especially in a left-hand turn, is at these certain locations along the turning arc toward the master unit $U_2$. When this occurs, the feedback through the tie rod 42 and the connecting linkage including crank 21 tends to cause a preemtive change in the supply valve mounted in the master unit $U_2$. This change occurs while the master unit $U_2$ is still trying to turn its wheel $W_2$ in the proper direction. As a consequence, the units $U_1$, $U_2$ engage in a "fight" and chattering of the system occurs.

Figure 2A:
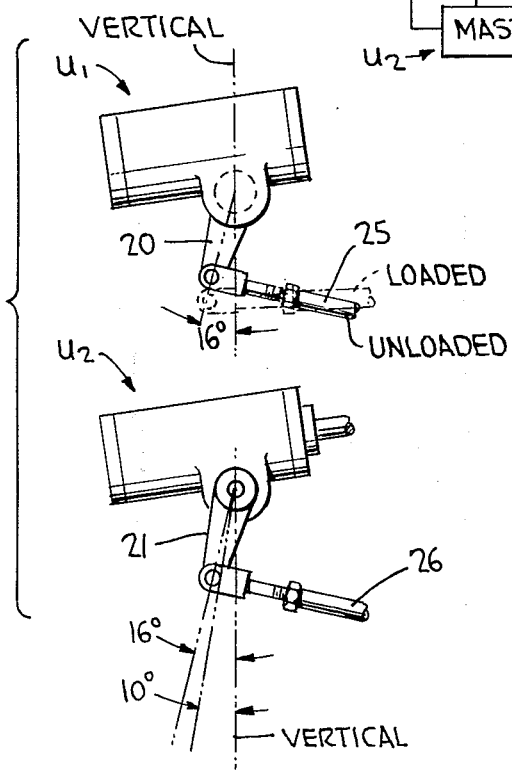
FIGS. 2a and 2b are representations of the preferred embodiment with the two power steering units and the steered front wheels, respectively, for the straight ahead driving mode.
Figure 2B:
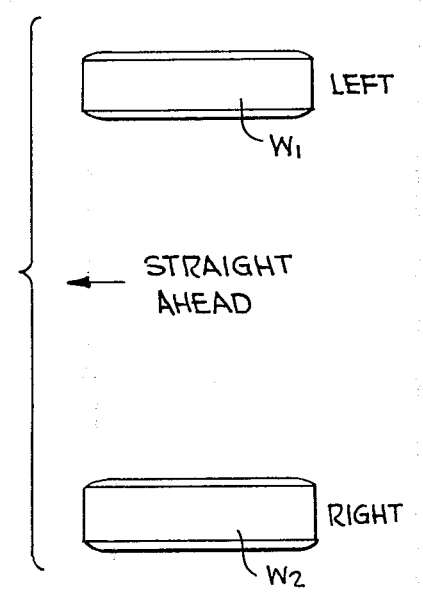

The FIGS. 2a, 2b thus show the steering units $U_1$, $U_2$ in the straight ahead position with the cranks 20, 21 in full line position at a particular angle off vertical in accordance with the principles of the present invention, as will be explained momentarily. The drag link 25 is also shown in full line outline and this is the situation where the truck or other vehicle would be unloaded. The dotted line position of the drag link is where the truck would be loaded. The change in relative position is of course due to the weight of the truck upon which the unit $U_1$ is mounted. The frame of the truck moves down causing the crank 20 to move downwardly as the weight is applied. Under ideal conditions, the drag link 25 is horizontal when the truck has the maximum load and is at an angle approximating 5°–10° when the truck is unloaded. The principles of the present invention are slightly affected by the relative loading of the truck, and accordingly a step is provided in the adjustment process for checking of the conditions under both the loaded and unloaded conditions.

To further explain the invention, I have chosen to set forth a specific example of a truck steering system that has been adjusted. The angles given are meant to be illustrative in nature only; it being understood that each different model truck or vehicle would have similar but different relationships. The example given is for a 1974 International Harvester truck, Model 5000 Paystar, and the figures are for the loaded condition.

Accordingly, the crank arms 20, 21 are positioned at an angle 16° forward of the vertical line in the embodiment shown. As will be seen, this angle gives the desired mechanical advantage factor ratio used as a guide or formula to carry out the present invention. The cranks 20, 21 are maintained in the same relative position with respect to the vertical, so that the drag links 25, 26 are the same adjusted lengths. The straight ahead steering mode is exemplified by the position of the wheels $W_1$, $W_2$ in FIG. 2b.

Figure 3A:
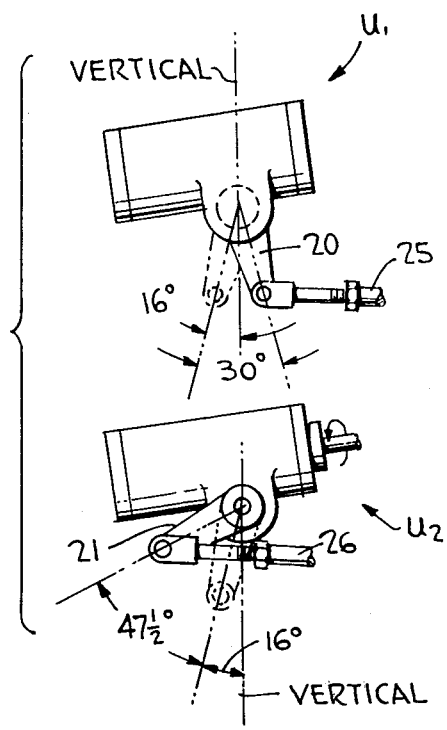
FIGS. 3a and 3b are representations of the preferred embodiment with the power steering units and the steered wheels, respectively, in a full left turn mode.
Figure 3B:
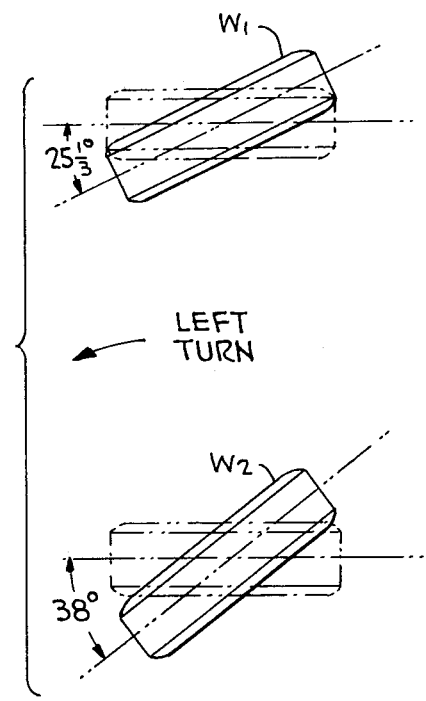

In a left-hand turn mode, the units $U_1$, $U_2$ operate in accordance with the invention to move the cranks 20, 21 through arcs, as shown in FIG. 3a. In the typical set-up used to exemplify the preferred embodiment, the movement of the crank 20 required to steer the right wheel $W_1$ is 30°. As shown in FIG. 3b, the right wheel thus turns through an angle of 25⅓°.

As for the left wheel $W_2$, the crank 21 of the unit $U_2$ moves (in the opposite direction) through a greater angle, 47½° turning the left wheel through the required angle of 38°.

The difference in turning of the wheels is of course to provide proper tracking of the wheels around the turn. This tracking is such that scuffing of the wheels will not take place and a smooth turn is effected.

As will be apparent to those skilled in the mechanical arts, the transposition of "oscillating to oscillating" motion is taking place between the cranks 20, 21 and the steering arms 35, 36. In accordance with basic mechanical principles, when the cranks 20, 21 are moved through an angle greater than that of the steering arms, and thus the wheels $W_1$, $W_2$, there is a mechanical advantage gained. This mechanical advantage is a result of the geometry that exists between the output arms 20, 21 and the drag links 25, 26. The larger the crank angle compared to the steering arm (or wheel) angle, the more mechanical advantage gained.

In accordance with the present invention, the relative mechanical advantages obtained by the units $U_1$, $U_2$ are important. The underlying proposition or heart of the present invention is that if the mechanical advantage factor of the master unit $U_2$ (output crank angle divided by steering angle) is greater than the same relationship of the slave unit $U_1$, then the master unit $U_2$ will dominate, feedback from the slave to the master to the tie rod 42 is prevented and preemptive change of the position of the valve is not possible.

With the arms 20, 21 moved 16° forward, that is away from the steering arms 35, 36, the desired relationship is found in the specific example given. Thus, referring to the formula below FIGS. 3a and 3b, the arc of movement of the crank 21 (47.5°) divided by the angle of the wheel $W_2$ (38°) is equal to a ratio of 1.250. The corresponding mechanical advantage factor of the slave unit $U_1$ is represented by 30° over 25.3°, or 1.186. Comparing the two, it can be seen that the master mechanical advantage factor is greater than the slave mechanical advantage factor, and accordingly, the ratio of the two is greater than one, as desired. Because of the relationship, the master unit $U_2$ has the advantage and will consequently work less during the left turn and any residual will be toward the slave unit $U_1$ rather than vice versa.

Because the output crank 21 has to move through a greater angle, the movement will be at a greater speed than the crank 20 of the slave unit $U_1$. This is consistent with the synchronization of the power steering system. The locked position of both wheels in the left turn mode is reached at substantially the same time.

The hydraulic pressure within the units $U_1$, $U_2$ is at the same ratio as the ratio of the mechanical advantage factors. That is, since the slave unit $U_1$ has to work harder to accomplish the turning of the wheel $W_1$ than the master unit $U_2$ has to work to turn its wheel $W_2$, the hydraulic pressure is 1.250 divided by 1.186 times the hydraulic pressure in the master unit $U_2$. Thus, if the pressure is 1,000 lbs./sq. in. in the master unit, the pressure is approximately 1,050 lbs./sq. in. in the slave unit. The corrected pressure is the average, or approximately 1,025 lbs./ sq. in.

Figure 4A:
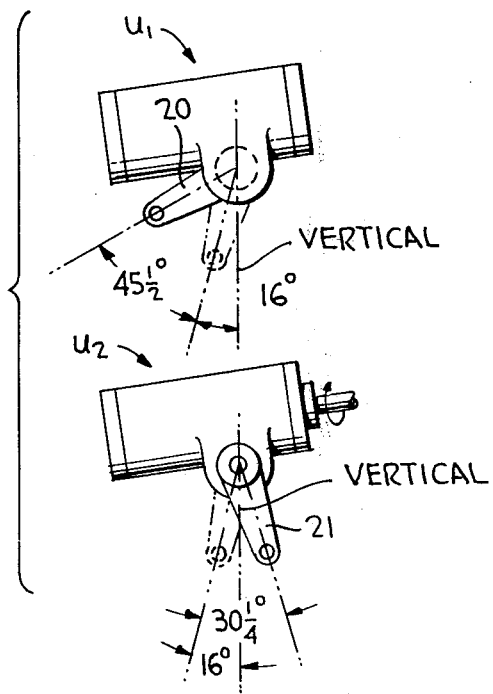
FIGS. 4a and 4b are representations of the preferred embodiment with the power steering units and the steered wheels, respectively, in the full right turn mode.
Figure 4B:
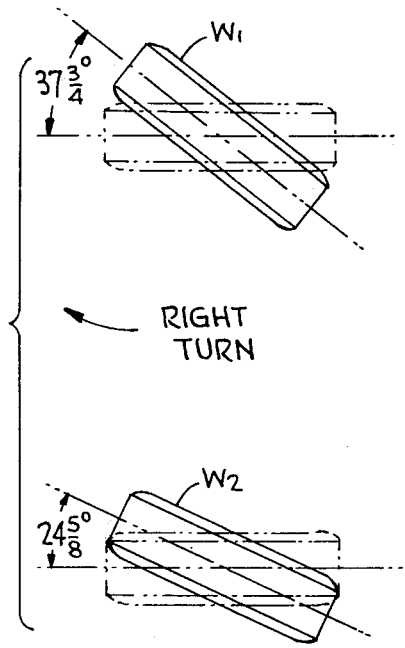

The right turn mode of the power steering system of the present invention is shown in FIGS. 4a and 4b. Here the crank 20 of the slave unit $U_1$ is moving through maximum angle of 45½° while effecting a 37¾° turn in the wheel $W_1$. The crank 21 of the master unit $U_2$ moves through an angle 30¼° while effecting a turn of 24⅝°. Setting up the formula, we find that the mechanical advantage factor of the master is 1.226 and the mechanical advantage factor of the slave is 1.205. The ratio of the factors is greater than one, as desired.

In the method according to the invention in order to find the proper relationship as desired above, the first step is to determine the position of the output cranks 20, 21 where the maximum throw and thus the maximum utilization of the output power of the units $U_1$, $U_2$ would occur. This maximum throw is designed to take place in the region of straight ahead driving. In the present instance, that position of the crank 21 approximately 10° from vertical, as shown by the angle in FIG. 2b, is the position for placement of the crank 20 where with an average load, maximum throw would be obtained.

Since the angles of turning to the left and right are substantially the same, the location of this point assures that the maximum throw and utilization of the output power of the two units can occur during the steering arc from one locked position through straight ahead to the opposite locked position. However, in this position, the ratio of the mechanical advantage factor of the master to the mechanical advantage of the slave unit would not meet the prerequisite of being greater than one, and thus undesirable chattering and fighting between the steering units would occur. By moving the crank arms 20, 21 forward another 6° in the example given, the necessary ratio is obtained, as set forth above and as computed in FIGS. 3 and 4.

The final adjustment to adjust the right angle may be by use of the threaded drag links 27, 28, and then locked in position by the lock nuts 29, 30. As the adjustments are made off the position for maximum throw and utilization, it is important to move by the least amoung possible, that is, just beyond the threshold value of one. This minimizes the loss of output power while maintaining the dominance of the master unit $U_2$ required to prevent the deleterious feedback condition from developing.

The drag links 25, 26 do not need to be adjustable per se. These drag links can in actual practice be made to specification to fit the particular truck on which the dual system is being mounted. Once the computations have been made by the formula and the adjustment made by the engineers, the length of the drag links 25, 26 is fixed and need not be changed thereafter.

A final step in the method is to check the relationship for both the loaded and unloaded conditions of the vehicle. As shown in FIG. 2a, the drag links do change in position, which changes the geometry of the system.

This change is reflected in slightly different angles. When the ratio for both the loaded and unloaded conditions of the vehicle check out greater than one, the length of the drag links has been determined, and no further adjustment is necessary.

Figure 5:
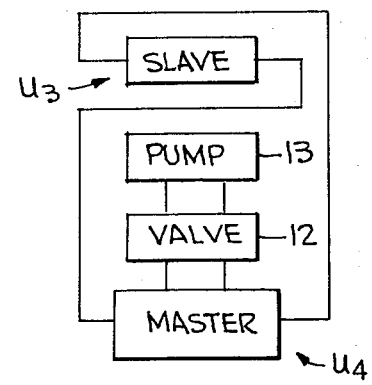
FIG. 5 is a schematic diagram of a second embodiment of the invention wherein the master steering unit is larger than the slave unit to obtain the increased mechanical advantage factor.

In FIG. 5, a schematic diagram of a second embodiment of the present invention is shown. In this figure, the slave unit $U_3$ is directly dominated by the master unit $U_4$. This is accomplished by making the master unit $U_4$ larger, or with sufficiently greater output power rating than that of the slave unit $U_3$ to provide the mechanical advantage ratio greater than one that is required. In this embodiment, the master and slave units $U_4$, $U_3$ are also provided with hydraulic fluid through the same type of valve means 12 and pump means 13. In the second embodiment, the economies of making the basic power steering unit interchangeable is sacrificed. Also, with the second embodiment, existing dual systems with units of the same size cannot be corrected to eliminate chattering by a simple adjustment of the drag link.

In summary, a new concept has been provided to solve the problem of steering chatter that can occur in dual power steering systems. The solution to the problem and thus the invention lies broadly in providing the mechanical advantage factor ratio between the master unit $U_2$ and the slave unit $U_1$ greater than one. When this is done, the tendency for feedback from the slave unit $U_1$ through the tie rod 42 to the master unit $U_2$ is obviated and there can be no preemptive change in the position of the control valve within the master unit $U_2$. In the preferred embodiment, the mechanical advantage factor ratio greater than one is gained by moving the cranks 20, 21 beyond the position of maximum throw and utilization away from the steering arms 35, 36 (see FIG. 1) so that the angle of movement of the crank divided by the angle of movement of the steering arm of the master unit $U_2$ is greater than the corresponding factor in the slave unit $U_1$. In summarizing the steps of the method, these include determining the position of the output cranks 20, 21 of the units $U_1$, $U_2$ to gain maximum throw and utilization in the region of straight ahead driving, and then adjusting the drag links off the position by the required amount. The adjustment is in the direction so that the ratio of mechanical advantage factor of the master gear $U_2$ to that of the slave gear $U_1$ is greater than one, whereby the master unit dominates the slave unit.

In this disclosure, there are shown and described only the preferred embodiments of the invention, but, as aforementioned, it is to be understood that the invention is capable of use in various other combinations and environment and is capable of changes or modifications within the scope of the invention concept as expressed herein.

What is claimed is:

1. A dual power steering system including steering linkage connected to the vehicle wheels, comprising:
    a master steering unit;
    a slave steering unit;
    valve means on said master unit for controlling said steering units;
    an output crank on each steering unit;
    a steering arm of the linkage for each crank;
    tie means for synchronizing said steering arms;
    a drag link between said crank and said steering arm for each steering unit; and
    each unit having a mechanical advantage factor, the ratio of the mechanical advantage factor of said master unit to that of the slave unit being greater than one, whereby said master unit dominates said slave unit to prevent feedback through said tie means and preemptive change in positioning of said valve means by said slave unit.

2. In the dual power steering system of claim 1 wherein the output power rating of said units is approximately the same, the mechanical advantage factor being generally defined by the angle of movement of the crank divided by the angle of movement of the steering arm.

3. In the dual power steering system of claim 2 wherein the left and right front wheels turn through different angles for proper tracking.

4. In the dual power steering system of claim 3 wherein said drag links are substantially the same length, the cranks being positioned for straight ahead driving beyond the position of maximum throw away from said steering arms.

5. In the dual power steering system of claim 1 wherein the output power rating of said master unit is sufficiently greater than that of said slave unit to provide said mechanical advantage ratio greater than one.

6. A method of adjusting a dual power steering system having a master and slave unit each with output crank, valve means on said master unit, and steering linkage connected to the wheels of the vehicle including steering arms, tie means and adjustable drag links, the steps comprising:
    determining the positions of the output cranks and connected drag links on said units to gain maximum throw and utilization of the output power for steering in the region of straight ahead driving; and
    adjusting said drag links to position said output cranks off the position of maximum throw and utilization;
    the adjustment being in the direction to provide the ratio of mechanical advantage factor of the crank and drag link connected to thte master gear to that of the slave gear greater than one, whereby said master unit dominates said slave unit to prevent feedback through said tie means and preemptive change in positioning of said valve means by said slave unit.

7. The adjusting method of claim 6 wherein the ratio of mechanical advantage factors is only slightly greater than threshold value of one to maximize the output power of the steering units while maintaining the dominance of the master unit.

8. The adjusting method of claim 7 wherein said drag links are adjusted to substantially the same length, the cranks being positioned for straight ahead driving beyond the position for maximum throw away from said steering arms.

9. The adjusting method of claim 6 wherein is provided an additional step of checking the adjustment for both the loaded and the unloaded conditions of the vehicle.

* * * * *